United States Patent [19]

Tarusawa et al.

[11] Patent Number: 5,715,525
[45] Date of Patent: Feb. 3, 1998

[54] RADIO FREQUENCY CIRCUIT FOR PORTABLE RADION COMMUNICATION DEVICE

[75] Inventors: Yoshiaki Tarusawa, Yokohama; Toshio Nojima, Yokosuka, both of Japan

[73] Assignee: NTT Mobile Communications Network Inc., Tokyo, Japan

[21] Appl. No.: 672,480

[22] Filed: Jun. 26, 1996

[30] Foreign Application Priority Data

Jun. 26, 1995 [JP] Japan .................................. 7-159350

[51] Int. Cl.[6] ........................................ H04B 1/56
[52] U.S. Cl. ........................ 455/101; 455/133; 455/78; 455/134; 455/135; 455/277.1; 455/275
[58] Field of Search .......................... 455/101, 133–135, 455/77–79, 277.1, 277.2, 275, 86, 89, 76; H04B 1/56

[56] References Cited

U.S. PATENT DOCUMENTS

| | | | |
|---|---|---|---|
| 4,876,743 | 10/1989 | Lindenmeier et al. | 455/275 |
| 4,914,714 | 4/1990 | Tamura | 455/78 |
| 5,159,707 | 10/1992 | Mogi et al. | 455/275 |
| 5,276,920 | 1/1994 | Kuisma | 455/101 |
| 5,444,745 | 8/1995 | Ali-Vehmas | 455/133 |
| 5,465,409 | 11/1995 | Borras et al. | 455/86 |
| 5,475,677 | 12/1995 | Arnold et al. | 455/89 |
| 5,491,723 | 2/1996 | Dipestraten | 455/101 |

FOREIGN PATENT DOCUMENTS

| | | | |
|---|---|---|---|
| 481825 | 4/1992 | European Pat. Off. | H04B 1/44 |
| 556010 | 8/1993 | European Pat. Off. | H04B 7/10 |
| 624007 | 11/1994 | European Pat. Off. | H04B 7/08 |
| 2279212 | 12/1994 | United Kingdom | H04B 7/08 |
| WO-A-9415408 | 7/1994 | WIPO | H04B 7/08 |
| WO-A-9502287 | 1/1995 | WIPO | H04B 7/04 |

*Primary Examiner*—Tommy P. Chin
*Assistant Examiner*—Vu Le
*Attorney, Agent, or Firm*—Scully, Scott, Murphy and Presser

[57] ABSTRACT

Band-pass filters BPF1, BPF2, and BPF3 correspond to the reception frequency band for FDD, the transmission band for FDD, and the band for TDD, respectively. An antenna A1 is used in common for transmission and reception in the FDD and TDD systems. Another antenna A2 is used for diversity reception in the FDD system. A controller 20 controls switches SW1 through SW4. When the FDD system is selected, the reception signal is sent from the antenna A1 or A2 through the filter BPF1 to a reception amplifier RA, and the transmission signal is sent from the transmission amplifier TA through the filter BPF2 to the antenna A1. When the TDD system is selected, the reception signal is sent from the antenna A1 through the filter BPF3 to the reception amplifier RA, and the transmission signal is sent from the transmission amplifier TA through the filter BPF3 to the antenna A1.

4 Claims, 6 Drawing Sheets

FIG. 2

OPERATIONAL MANNER OF THE SWITCHES AND ANTENNAS IN THE FIRST EMBODIMENT

| DUPLEX | SWITCH SW1 | SWITCH SW2 | SWITCH SW3 | SWITCH SW4 | ANTENNA A1 | ANTENNA A2 |
|---|---|---|---|---|---|---|
| FDD | TERMINAL A OR B FOR THE DIVERSITY RECEPTION | TERMINAL B | TERMINAL A | TERMINAL B | TRANSMISSION AND DIVERSITY RECEPTION | DIVERSITY RECEPTION |
| TDD | TERMINAL A | TERMINAL A | TERMINAL A WHEN TRANSMISSION / TERMINAL B WHEN RECEPTION | TERMINAL A WHEN TRANSMISSION / TERMINAL B WHEN RECEPTION | TRANSMISSION AND RECEPTION | |

FIG. 5

OPERATIONAL MANNER OF THE SWITCHES AND ANTENNAS IN THE SECOND EMBODIMENT

| DUPLEX | SWITCH SW1 | SWITCH SW2 | SWITCH SW3 | ANTENNA A1 | ANTENNA A2 |
|---|---|---|---|---|---|
| FDD | TERMINAL A OR B FOR THE DIVERSITY RECEPTION | TERMINAL A | TERMINAL B | TRANSMISSION AND DIVERSITY RECEPTION | DIVERSITY RECEPTION |
| TDD | TERMINAL A | TERMINAL A WHEN TRANSMISSION | TERMINAL B WHEN TRANSMISSION | TRANSMISSION AND RECEPTION | |
| | | TERMINAL B WHEN RECEPTION | TERMINAL A WHEN RECEPTION | | |

RADIO FREQUENCY CIRCUIT FOR PORTABLE RADION COMMUNICATION DEVICE

BACKGROUND OF THE INVENTION

The present invention relates to a radio frequency circuit for a portable radio communication device.

The frequency division duplex (FDD) and the time division duplex (TDD) systems have been utilized for bi-directional systems such as mobile radio telephone systems, cellular telephone systems, and the like.

More exactly, the FDD is used for various digital cellular telecommunication systems: the North America digital cellular system, the global system for mobile communications, and the personal digital cellular telecommunication system in Japan. FIG. 6A shows an example of radio frequency circuits in portable station devices for FDD systems. This circuit comprises a reception amplifier (low noise amplifier) 1 for amplifying the reception signal; and a band-pass filter 2 for permitting only the compositions in the frequency band for the reception signal to pass through with little attenuation. This circuit also comprises a transmission amplifier (power amplifier) 3; and a band-pass filter 4 for permitting only the compositions in the band for the transmission signal to pass through with little attenuation. While a common antenna 5 is provided for both transmission and reception, another antenna 6 is provided for space diversity reception. A switch 7 switches between the antennas 5 and 6, as effective to conduct space diversity reception.

The TDD is used for cordless telephone systems: the cordless telephone 2nd generation, the digital European cordless telephone system, and the personal handy-phone system in Japan. FIG. 6B shows an example of radio frequency circuits in portable station devices for TDD systems. This circuit comprises a band-pass filter 8, a switch 9, a reception amplifier 11, and a transmission amplifier 13. In TDD systems, it is possible that the same frequency band is utilized in common for both transmission and reception. Therefore, the single band-pass filter 8 is used in common for transmission and reception, while the switch 9 switches the transmission or reception state for the band-pass filter 8.

As described above, TDD systems need portable station devices which are different from those used in FDD systems. The portable devices for FDD system and TDD system have conventionally been manufactured independently. For this reason, it has been necessary for consumers to have two kinds of portable devices if they want to utilize both the FDD and TDD systems.

SUMMARY OF THE INVENTION

Accordingly, it is an object of the present invention to propose a radio frequency circuit for a radio communication device which can be used in common for the frequency division duplex system and the time division duplex system.

In one aspect of the invention, a radio frequency circuit for a portable radio communication device includes a transmission terminal through which a transmission signal is introduced into the radio frequency circuit, and a reception terminal through which a reception signal is output from the radio frequency circuit to another device. This radio frequency circuit is characterized in that it comprises first and second antennas; first, second, and third band-pass filters; first, second, and third switching means; and controlling means.

The first antenna is capable of resonating at an FDD transmission frequency band used for transmission in a frequency division duplex system, resonating at an FDD reception frequency band used for reception in the frequency division duplex system, and resonating at a TDD system frequency band used in a time division duplex system, the TDD system frequency band differing from both the FDD transmission and reception frequency bands. The second antenna is capable of resonating at the FDD reception frequency band.

The first band-pass filter permits only components whose frequencies lie in the FDD reception frequency band to pass through with little attenuation, the first band-pass filter having an input terminal and an output terminal. The second band-pass filter permits only components whose frequencies lie in the FDD transmission frequency band to pass through with little attenuation, the second band-pass filter having an input terminal and an output terminal. The third band-pass filter permits only components whose frequencies lie in the TDD system frequency band to pass through with little attenuation, the third band-pass filter having first and second input/output terminals.

The first switching means switches to connect either the first antenna or second antenna with the input terminal of the first band-pass filter, and switches to connect the first antenna with either the output terminal of the second band-pass filter or the first input/output terminal of the third band-pass filter. The second switching means switches to connect either the output terminal of the first band-pass filter or the second input/output terminal of the third band-pass filter with the reception terminal. The third switching means switches to connect either the input terminal of the second band-pass filter or the second input/output terminal of the third band-pass filter with the transmission terminal.

The controlling means controls the first, second, and third switching means. The controlling means causes the second switching means to connect the reception terminal with the output terminal of the first band-pass filter; causes the third switching means to connect the transmission terminal with the input terminal of the second band-pass filter; and causes the first switching means to connect selectively either the first antenna or second antenna with the input terminal of the first band-pass filter, thereby carrying out space diversity reception when selection of the frequency division duplex system is indicated. In addition, the controlling means causes the second switching means to connect the reception terminal with the second input/output terminal of the third band-pass filter; causes the third switching means to connect the transmission terminal with the second input/output terminal of the third band-pass filter; and causes the first switching means to connect the first antenna with the first input/output terminal of the third band-pass filter when selection of the time division duplex system is indicated.

It is preferable that the controlling means controls the first switching means, so that the first switching means disconnects the second antenna from the first input/output terminal of the third band-pass filter when selection of the time division duplex system is indicated.

Preferably, the controlling means controls the second and third switching means, so that the second switching means disconnects the reception terminal from the second input/output terminal of the third band-pass filter, and the third switching means connects the transmission terminal with the second input/output terminal of the third band-pass filter in case that transmission is carried out when selection of the time division duplex system is indicated. In addition, the controlling means controls the second and third switching means, so that the second switching means connects the reception terminal with the second input/output terminal of the third band-pass filter, and the third switching means disconnects the transmission terminal from the second input/output terminal of the third band-pass filter in case that reception is carried out when selection of the time division duplex system is indicated.

In another aspect of the invention, a radio frequency circuit for a portable radio communication device includes a transmission terminal through which a transmission signal is introduced into the radio frequency circuit and a reception terminal through which a reception signal is output from the radio frequency circuit to another device. This radio frequency circuit is characterized in that it comprises first and second antennas; a band-pass filter; a low-pass filter; first and second switching means, and controlling means.

The first antenna is capable of resonating at an FDD transmission frequency band used for transmission in a frequency division duplex system, resonating at an FDD reception frequency band used for reception in the frequency division duplex system, and resonating at a TDD system frequency band used in a time division duplex system, the TDD system frequency band being above both the FDD transmission and reception frequency bands. The second antenna is capable of resonating at the FDD reception frequency band.

The band-pass filter permits only components whose frequencies lie in the FDD transmission frequency band and the FDD reception frequency band to pass through with little attenuation, the band-pass filter having an input terminal and an output terminal. The low-pass filter permits only components whose frequencies lie at or below the TDD system frequency band to pass through with little attenuation, the low-pass filter having first and second input/output terminals, the first input/output terminal being connected with the first antenna.

The first switching means switches to connect either the first antenna or the second antenna with the input terminal of the band-pass filter. The second switching means switches to connect the output terminal of the band-pass filter with the reception terminal, and switches to connect the second input/output terminal of the low-pass filter with either the transmission terminal or the reception terminal.

The controlling means controls the first and second switching means. The controlling means causes the second switching means to connect the reception terminal with the output terminal of the band-pass filter; causes the second switching means to connect the transmission terminal with the second input/output terminal of the low-pass filter; and causes the first switching means to connect selectively either the first antenna or second antenna with the input terminal of the band-pass filter, thereby carrying out space diversity reception when selection of the frequency division duplex system is indicated. In addition, the controlling means causes the second switching means to connect the reception terminal with the second input/output terminal of the low-pass filter in case that the reception is carried out when selection of the time division duplex system is indicated. Furthermore, the controlling means causes the second switching means to connect the transmission terminal with the second input/output terminal of the low-pass filter in case that the transmission is carried out when selection of the time division duplex system is indicated.

By means of the present invention, it is possible to communicate in the frequency division duplex system and in the time division duplex system using with a single portable station device manufactured as one unit. Furthermore, some structural components of the circuit may be used in common for both systems, so that the size of the portable station device may be minimized.

BRIEF DESCRIPTION OF THE DRAWINGS

FIG. 2 is a table describing the operational manner of the first embodiment in FIG. 1A;

FIG. 5 is a table describing the operational manner of the first embodiment in FIG. 4A;

DETAILED DESCRIPTION OF PREFERRED EMBODIMENTS OF THE INVENTION

Figure 1A:
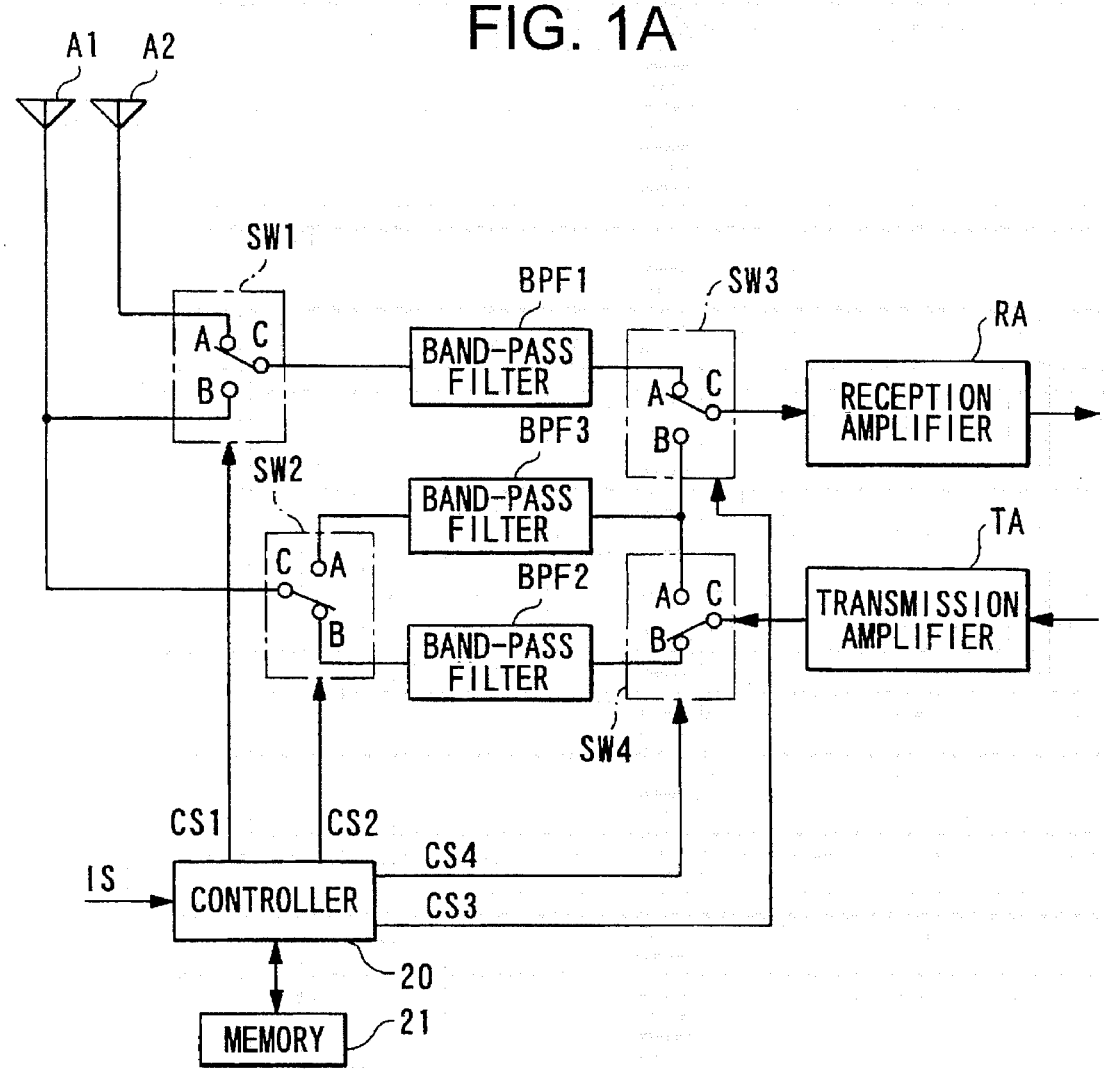
FIG. 1A is a block diagram showing a first embodiment of the present invention.

The present invention will be more specifically described hereinafter with reference to the accompanying drawings.
First Embodiment As shown in FIG. 1A, in the present invention, a radio frequency circuit comprises two antennas A1 and A2, four switches SW1 through SW4, three band-pass filters BPF1 through BPF3, and two wide band amplifiers RA and TA. The amplifier RA is a low noise amplifier which amplifies FDD reception signals and TDD reception signals, the amplified transmission signals being sent to a sound generator (not shown). The other amplifier TA is a power amplifier which amplifies FDD transmission signals and TDD transmission signals from another processing circuit (not shown).

The band-pass filters BPF1 and BPF2 are used for the FDD system. The band-pass filter BPF1 permits only the components in the frequency band for FDD reception signals to pass through with little attenuation, all other components being highly attenuated. The band-pass filter BPF2 permits only the components in the frequency band for the FDD transmission signals to pass through with little attenuation. The other band-pass filter, BPF3, is used for both TDD transmission and TDD reception, and permits only the components in the band for TDD transmission and reception signals to pass through with little attenuation. It should be understood by those skilled in the art that the frequency band for TDD transmission is the same as that for TDD reception.

Figure 1B:
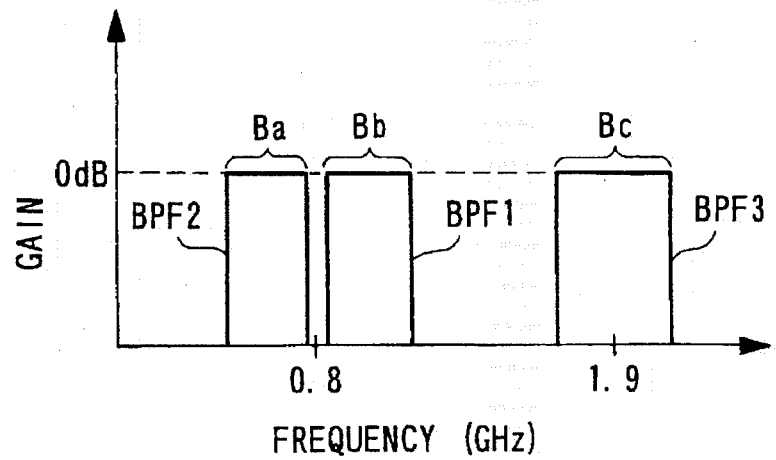
FIG. 1B shows properties of band-pass filters BPF1, BPF2, and BPF3 of the circuit in FIG. 1A.

FIG. 1B depicts the bands of the frequency in which the components can pass through the band-pass filters BPF1, BPF2, and BPF3 in FIG. 1A. In FIG. 1B, the frequency band Ba corresponds to the band-pass filter BPF2. This frequency band Ba coincides with the frequency band for FDD transmission. The frequency band Bb, which corresponds to the band-pass filter BPF1, coincides with for FDD reception. Lastly, the frequency band Bc, corresponding to the band-pass filter BPF3, coincides with that for TDD transmission and reception.

As will be understood from FIG. 1B, the frequency bands Ba and Bb used in the exemplified FDD system are below the frequency band Bc used in the exemplified TDD system. More specifically, it is assumed that the FDD uses 810 to 826 MHz for reception and 940 to 956 MHz for transmission, and that the TDD uses 1895 to 1907 MHz for both reception and transmission. These assumed frequency values are based on the RCR standard in Japan. However, it will be appreciated by those skilled in the art that the present invention is not limited to these values, and these values may vary depending on the communication systems in which the present invention will be applied.

In order to communicate under both the FDD and TDD systems, the switches SW1 through SW4 are provided in the circuit. For better understanding, it is illustrated in FIG. 1A that each of the switches SW1 through SW4 includes terminals A, B, and C. The switches SW1 to SW4 may be replaced by semiconductor elements, such as field-effect transistors in a practical application of the circuit. Other known switching elements may also be utilized.

A controller 20 provides control signals CS1 through CS4 for operating the switches SW1 through SW4, respectively. A command signal IS, representing the FDD or TDD system which the user want to use, is provided to the controller 20 from a manual switch (not shown). In response to the command signal IS, the controller 20 refers to a table stored in a memory 21 and generates the control signals CS1 through CS4 on the basis of the table. The table is depicted in FIG. 2.

Referring now to FIG. 2, the operational manner of the switches SW1 through SW4 by the controller 20 will be described. When the user selects the FDD system to be used, the switches SW2 and SW4 are switched respectively to the terminals B in FIG. 1A, so that the FDD transmission signals can be sent from the transmission amplifier TA through the band-pass filter BPF2 to the antenna A1 for emission. In addition, the switch SW3 is switched to the terminal A in FIG. 1A, so that the band-pass filter BPF1 is connected to the reception amplifier RA.

The other switch SW1 is selectively switched to terminal A or B, so that space diversity reception is carried out, whereby either the antenna A1 or the antenna A2 is selectively used depending on the reception conditions thereof during the FDD system is used. For this purpose, the level of the reception signals from the reception amplifier RA is measured and the result is provided to the controller 20. The controller 20 periodically alters the control signal CS1, and then, based on the level of the reception signals, determines which antenna A1 or A2 is advantageous for reception, selecting the decided antenna A1 or A2.

On the other hand, when the user selects the TDD system to be used, the switches SW1 and SW2 are switched respectively to the terminals A. Thus, the antenna A1 is connected to the band-pass filter BPF3. When the TDD system is selected, the controller 20 periodically switches the control signals CS3 and CS4 on and off, so that transmission and reception are alternated. As a result, when TDD transmission is to be carried out, the switches Sw3 and SW4 are switched respectively to the terminals A, so that the transmission amplifier TA is connected to the band-pass filter BPF3. In other words, the transmission amplifier TA is connected through the band-pass filter BPF3 to the antenna A1. On the contrary, when TDD reception is to be carried out, the switches Sw3 and SW4 are switched respectively to the terminals B, so that the reception amplifier RA is connected to the band-pass filter BPF3. In other words, the antenna A1 is connected through the band-pass filter BPF3 to the reception amplifier RA.

The antenna A1 functions as a transmission and reception antenna in the TDD system. When the FDD is selected, the antenna A1 is also used for not only transmission, but also for diversity reception. Accordingly, the antenna A1 is designed so as to resonate at all of the frequency bands Ba, Bb, and Bc. With regard to the present embodiment, the antenna A1 should resonate at approximately 0.8 GHz (Ba and Bb) and at approximately 1.9 GHz (Bc).

Figure 3:
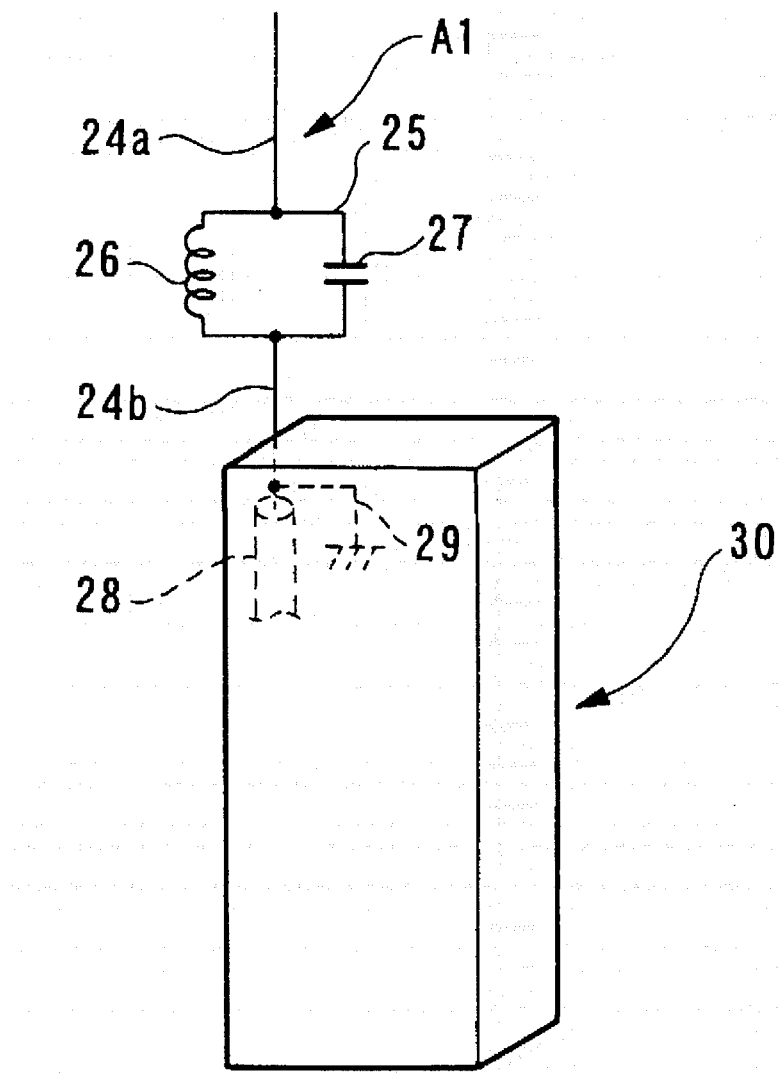
FIG. 3 is a perspective view showing an antenna A1 used in the circuit in FIG. 1A with a housing for the circuit

As illustrated in FIG. 3, the antenna A1 protrudes from the housing 30 of the portable station device and is connected to a coaxial cable 28 which is connected to the switches SW1 and SW2 in FIG. 1A. A grounding line 29 deviates from the connection point of the coaxial cable 28 and the antenna A1. The antenna A1 comprises a pair of main linear parts 24$a$ and 24$b$ arranged in the same line and a resonating circuit 25 situated at an intermediate point between the main linear parts 24$a$ and 24$b$. The resonating frequency of the antenna A1 as a whole structure is 0.8 GHz. The resonating circuit 25 includes an inductor 26 and a capacitor 27 arranged in parallel, and is able to resonate at 1.9 GHz. With such a structure, a current having a frequency component of approximately 0.8 GHz is able to flow from the coaxial line 28 to the distal linear part 24$a$, whereas a current having a frequency component of approximately 1.9 GHz is stopped at the resonating circuit 25 and cannot flow to the distal linear part 24$a$. In other words, in practicality, the antenna A1 has two lengths for resonation, and therefore, the antenna A1 may resonate at all of the frequency bands Ba, Bb, and Bc.

On the other hand, the antenna A2 functions only as a reception antenna in the FDD system. Therefore, the antenna A2 is designed so as to resonate at the frequency band Bb of FDD reception.

As described above, this radio frequency circuit, shown in FIG. 1A, comprises the wide band amplifiers RA and TA, the antenna A1 being able to resonate at the frequency bands Ba, Bb, and Bc, and the antenna A2 being able to resonate at the frequency band Bb. Consequently, it is possible to communicate in the FDD system and in the TDD system by means of a portable station device manufactured as a single unit.

In addition, some structural components of the circuit, e.g., the antenna A1 and the amplifiers RA and TA, may be used in common for both systems. Furthermore, the band-pass filter BPF3 is used in common for TDD transmission and reception. Therefore, the size of the portable station device may be minimized.

Second Embodiment

Figure 4A:
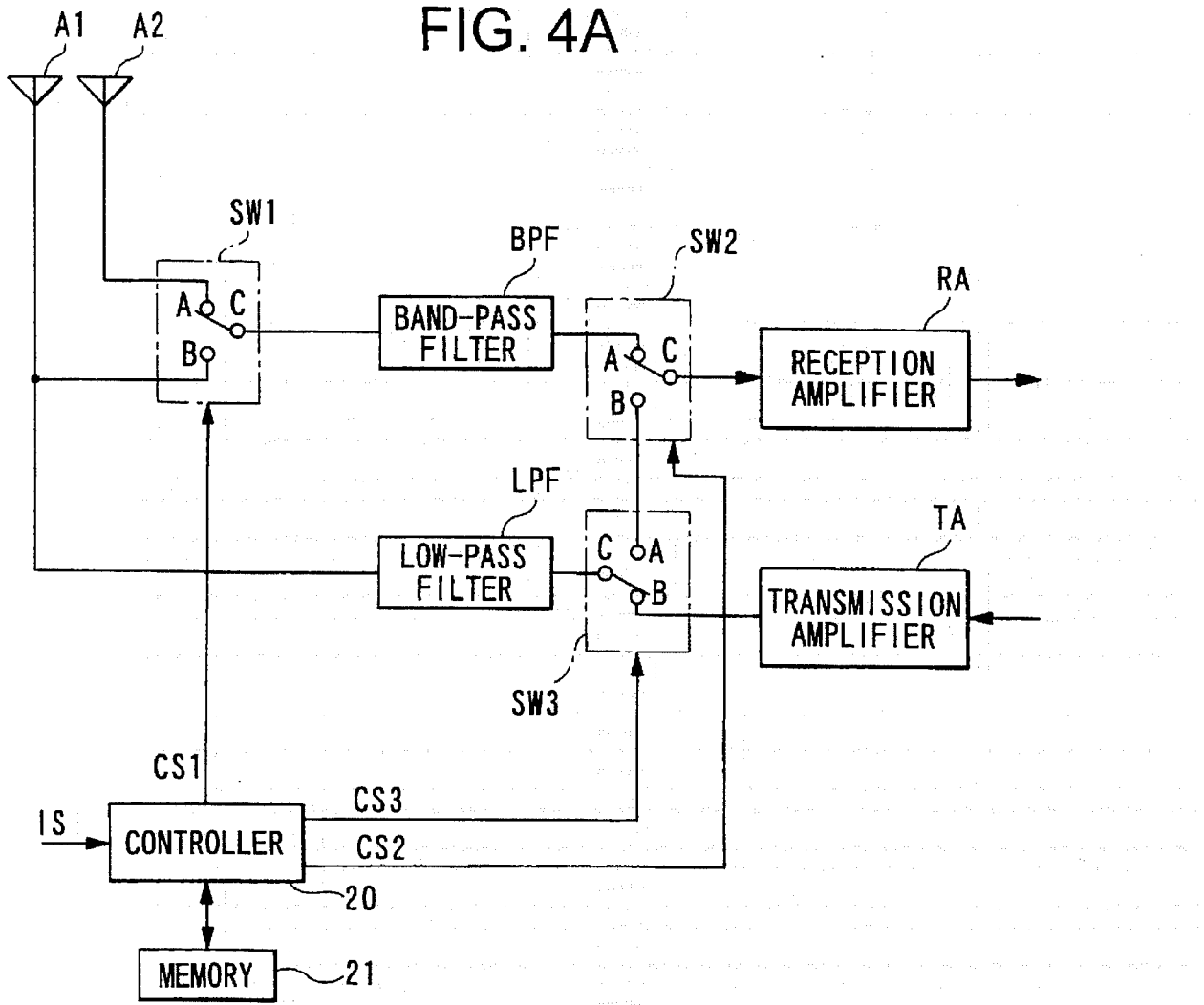
FIG. 4A is a block diagram showing a second embodiment of the present invention.

FIG. 4A represents another embodiment according to the present invention. The circuit in FIG. 4A is different from the first embodiment in that only one band-pass filter BPF and only three switches SW1 through SW3 are provided and that one low-pass filter LPF is added.

Figure 4B:
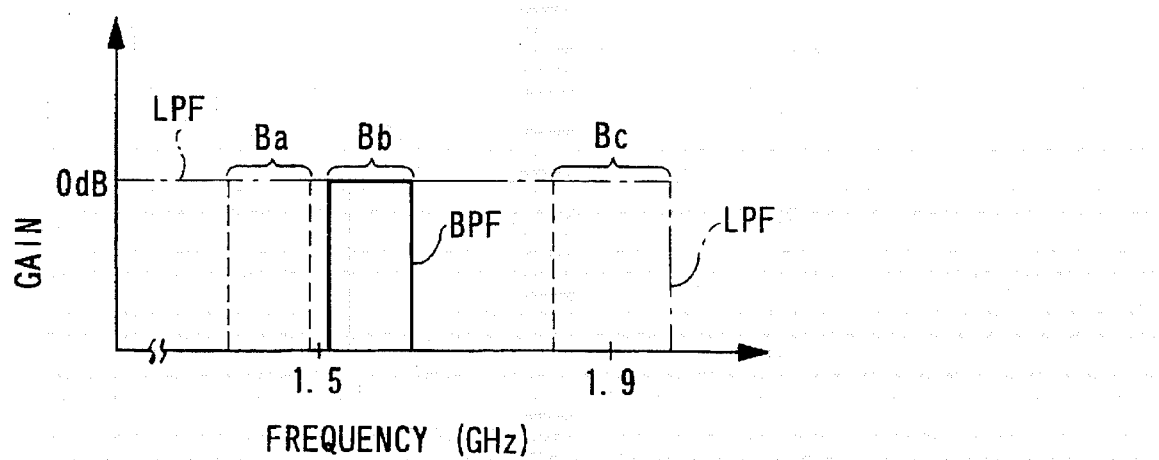
FIG. 4B shows properties of band-pass filter BPF and low-pass filter LPF of the circuit in FIG. 4A.
Figure 6A:
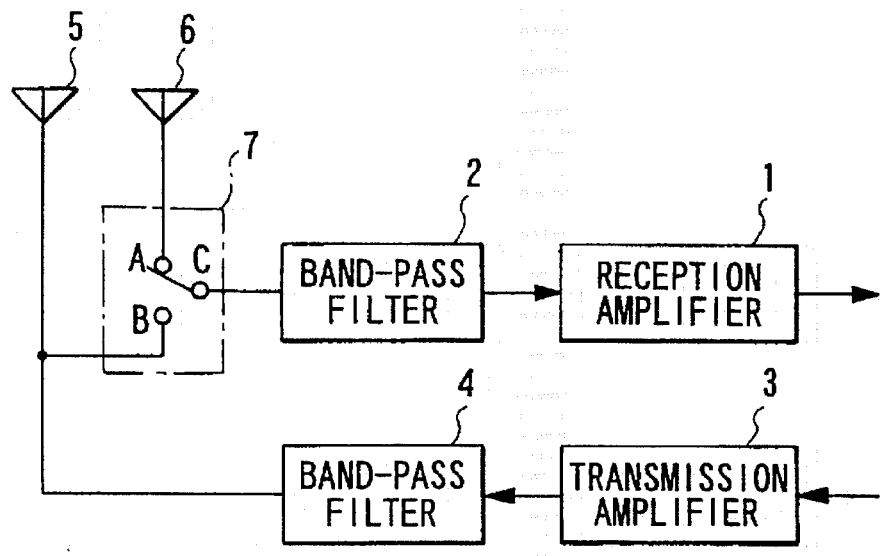
FIG. 6A is a block diagram showing an example of conventional radio frequency circuits in portable station devices for frequency division duplex systems.
Figure 6B:
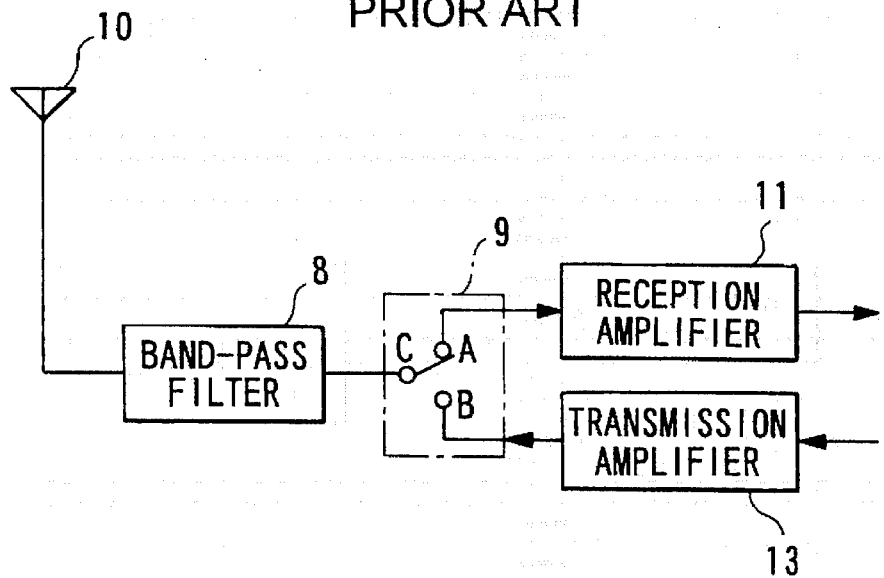
FIG. 6B is a block diagram showing an example of conventional radio frequency circuits in portable station devices for time division duplex systems.

FIG. 4B depicts the bands of the frequency in which the components can pass through the band-pass filter BPF and the low-pass filter LPF in FIG. 4A. As depicted by the solid line in FIG. 4B, the band-pass filter BPF permits only the components in the frequency band Bb for the FDD reception signals to pass through with little attenuation.

On the other hand, all of the TDD transmission signals (in the band Bc), the TDD reception signals (Bc), the FDD transmission signals (Ba), and the FDD reception signals (Bb) may pass through the low-pass filter LPF as depicted by the alternate long and short dashed line in FIG. 4B. More specifically, the low-pass filter LPF permits only components whose frequencies lie at or below approximately 1.9 GHz to pass through with little attenuation, all other components being highly attenuated.

As will be understood by FIG. 4B, it is assumed in the embodiment that the frequency bands Ba and Bb used in the FDD system are below the frequency band Bc used in the TDD system. More specifically, the exemplified FDD system uses 1427 to 1453 MHz for reception and 1477 to 1501 MHz for transmission, and the exemplified TDD system uses 1895 to 1907 MHz for both reception and transmission.

When transmission is carried out in both the FDD and TDD systems, it is almost inevitable that the transmission amplifier TA will generate undesirable waves. The main components of the undesirable waves have high frequencies which are more than the double the frequency of the transmission signals. Therefore, if the frequency band Ba for FDD transmission is below half of the highest frequency which can pass through the low-pass filter LPF, it is difficult to attenuate the undesirable waves with the low-pass filter LPF.

However, the undesirable waves generated in FDD transmission may be attenuated by the single low-pass filter LPF according to the present embodiment if the frequency band Ba for FDD transmission is near the frequency band Bc for TDD transmission and reception. Consequently, the ratio of the frequency for transmission in the FDD to the frequency for transmission in the TDD is preferably greater than 0.5 and less than 1.0 for this embodiment. For example, it is assumed in the embodiment that the exemplified FDD system uses the frequency bands which lie at approximately 1.5 GHz and the exemplified TDD system uses the frequency band which lies at approximately 1.9 GHz. However, the present invention is not limited to the above-mentioned values of the frequency band.

The low-pass filter LPF is used for TDD reception as well as FDD transmission and TDD transmission. In the case of TDD reception, there is the likelihood that the reception amplifier RA receives many radio signals with frequencies lying below the frequency band Bc, which can pass through the low-pass filter LPF. Accordingly, the reception amplifier RA is designed in a manner such that the response to the undesirable signals of which the frequencies lie below the frequency band Ba (approximately 1.5 GHz) may be small in order to prevent saturation of the reception amplifier RA.

The switches SW1 through SW3, for both the FDD and TDD systems, are of the same structure as those in FIG. 1A, but may be replaced by semiconductor elements, such as field-effect transistors, or other switching elements in a practical application of the circuit.

FIG. 5 depicts the table stored in the memory 21 to which the controller 20 in this embodiment refers for controlling the switches SW1 to SW3. Referring now to FIG. 5, the operational manner of the switches SW1 through SW3 by the controller 20 will be described. When the user selects the FDD system to be used, the switch SW2 is switched to the terminal A in FIG. 4A, so that the band-pass filter BPF is connected to the reception amplifier RA. In addition, the switch SW3 is switched to the terminal B in FIG. 4A, so that the FDD transmission signals can be sent from the transmission amplifier TA through the low-pass filter LPF to the antenna A1 for emission.

The other switch SW1 is selectively switched to terminal A or B, so that space diversity reception is carried out, whereby either the antenna A1 or the antenna A2 is selectively used depending on the reception conditions thereof during the FDD system is used. For this purpose, the level of the reception signals from the reception amplifier RA is measured and the result is provided to the controller 20. The controller 20 periodically alters the control signal CS1, and then, based on the level of the reception signals, determines which antenna A1 or A2 is advantageous for reception, selecting the decided antenna A1 or A2.

In contrast, when the user selects the TDD system to be used, the switch SW2 is switched to the terminal B and the switch SW1 is switched to the terminal A, so that the band-pass filter BPF is connected with the antenna A2, but is disconnected from the reception amplifier RA. When using with the TDD system, the controller 20 periodically switches the control signals CS3 and CS4 on and off, so that transmission and reception are alternated. As a result, when TDD transmission is carried out, the switch Sw3 is switched to the terminal B, so that the transmission amplifier TA is connected to the low-pass filter LPF. In other words, the transmission amplifier TA is connected through the low-pass filter LPF to the antenna A1. On the contrary, when TDD reception is carried out, the switch Sw3 is switched to the terminal A, so that the reception amplifier RA is connected to the low-pass filter LPF. Consequently, the antenna A1 is connected through the low-pass filter LPF to the reception amplifier RA.

In the embodiment, as in the first embodiment, the antenna A1 functions as a transmission and reception antenna when the TDD system is selected. Additionally, when the FDD system is selected, the antenna A1 is also used for not only transmission, but also for diversity reception. Accordingly, the antenna A1 is designed so as to resonate at all of the frequency bands Ba, Bb, and Bc as in the first embodiment. Also, since the antenna A2 functions only as a reception antenna when the FDD system is used, the antenna A2 is designed so as to resonate at the frequency band Bb of FDD reception as in the first embodiment.

As will be understood by the above description, the radio frequency circuit according to the second embodiment can achieve advantages identical to those of the first embodiment. In addition, since the number of filtering devices can be reduced, the size of the portable station device may be further decreased.

Although the various features of the present invention have been described with reference to the accompanying drawings, it is to be understood that the invention is not limited to the foregoing description and the various modifications may be made in the invention.

What is claimed is:

1. A radio frequency circuit for a portable radio communication device including a transmission terminal through which a transmission signal is introduced into the radio frequency circuit and a reception terminal through which a reception signal is output from the radio frequency circuit to another device, the radio frequency circuit comprising:

a first antenna capable of resonating at an FDD transmission frequency band used for transmission in a frequency division duplex system, resonating at an FDD reception frequency band used for reception in the frequency division duplex system, and resonating at a TDD system frequency band used in a time division duplex system, the TDD system frequency band differing from both the FDD transmission and reception frequency bands;

a second antenna capable of resonating at the FDD reception frequency band;

a first band-pass filter for permitting only components whose frequencies lie in the FDD reception frequency band to pass through with little attenuation, the first band-pass filter having an input terminal and an output terminal;

a second band-pass filter for permitting only components whose frequencies lie in the FDD transmission frequency band to pass through with little attenuation, the second band-pass filter having an input terminal and an output terminal;

a third band-pass filter for permitting only components whose frequencies lie in the TDD system frequency band to pass through with little attenuation, the third band-pass filter having first and second input/output terminals;

first switching means for switching to connect either the first antenna or the second antenna with the input terminal of the first band-pass filter, and for switching to connect the first antenna with either the output terminal of the second band-pass filter or the first input/output terminal of the third band-pass filter;

second switching means for switching to connect either the output terminal of the first band-pass filter or the second input/output terminal of the third band-pass filter with the reception terminal;

third switching means for switching to connect either the input terminal of the second band-pass filter or the second input/output terminal of the third band-pass filter with the transmission terminal; and controlling means for controlling the first, second, and third switching means, the controlling means causing the second switching means to connect the reception terminal with the output terminal of the first band-pass filter, causing the third switching means to connect the transmission terminal with the input terminal of the second band-pass filter, and causing the first switching means to connect selectively either the first antenna or the second antenna with the input terminal of the first band-pass filter, thereby carrying out space diversity reception when selection of the frequency division duplex system is indicated, the controlling means causing the second switching means to connect the reception terminal with the second input/output terminal of the third band-pass filter, causing the third switching means to connect the transmission terminal with the second input/output terminal of the third band-pass filter, and causing the first switching means to connect the first antenna with the first input/output terminal of the third band-pass filter when selection of the time division duplex system is indicated.

2. A radio frequency circuit according to claim 1, wherein the controlling means controls the first switching means, so that the first switching means disconnects the second antenna from the first input/output terminal of the third band-pass filter when selection of the time division duplex system is indicated.

3. A radio frequency circuit according to claim 1, wherein the controlling means controls the second and third switching means, so that the second switching means disconnects the reception terminal from the second input/output terminal of the third band-pass filter, and the third switching means connects the transmission terminal with the second input/output terminal of the third band-pass filter in case that the transmission is carried out when selection of the time division duplex system is indicated; and so that the second switching means connects the reception terminal with the second input/output terminal of the third band-pass filter, and the third switching means disconnects the transmission terminal from the second input/output terminal of the third band-pass filter in case that the reception is carried out when selection of the time division duplex system is indicated.

4. A radio frequency circuit for a portable radio communication device including a transmission terminal through which a transmission signal is introduced into the radio frequency circuit and a reception terminal through which a reception signal is output from the radio frequency circuit to another device, the radio frequency circuit comprising:

a first antenna capable of resonating at an FDD transmission frequency band used for transmission in a frequency division duplex system, resonating at an FDD reception frequency band used for reception in the frequency division duplex system, and resonating at a TDD system frequency band used in a time division duplex system, the TDD system frequency band being above both the FDD transmission and reception frequency bands;

a second antenna capable of resonating at the FDD reception frequency band;

a band-pass filter for permitting only components whose frequencies lie in the FDD transmission frequency band and the FDD reception frequency band to pass through with little attenuation, the band-pass filter having an input terminal and an output terminal;

a low-pass filter for permitting only components whose frequencies lie at or below the TDD system frequency band to pass through with little attenuation, the low-pass filter having first and second input/output terminals, the first input/output terminal being connected with the first antenna;

first switching means for switching to connect either the first antenna or the second antenna with the input terminal of the band-pass filter;

second switching means for switching to connect the output terminal of the band-pass filter with the reception terminal, and for switching to connect the second input/output terminal of the low-pass filter with either the transmission terminal or the reception terminal; and controlling means for controlling the first and second switching means, the controlling means causing the second switching means to connect the reception terminal with the output terminal of the band-pass filter, causing the second switching means to connect the transmission terminal with the second input/output terminal of the low-pass filter, and causing the first switching means to connect selectively either the first antenna or the second antenna with the input terminal of the band-pass filter, thereby carrying out space diversity reception when selection of the frequency division duplex system is indicated, the controlling means causing the second switching means to connect the reception terminal with the second input/output terminal of the low-pass filter in case that the reception is carried out when selection of the time division duplex system is indicated, the controlling means causing the second switching means to connect the transmission terminal with the second input/output terminal of the low-pass filter in case that the transmission is carried out when selection of the time division duplex system is indicated.

* * * * *